Oct. 6, 1964 D. KLEIST 3,152,200
METHOD AND APPARATUS FOR FORMING A HIGH DENSITY FIBROUS MASS
Filed Dec. 5, 1960 3 Sheets-Sheet 1
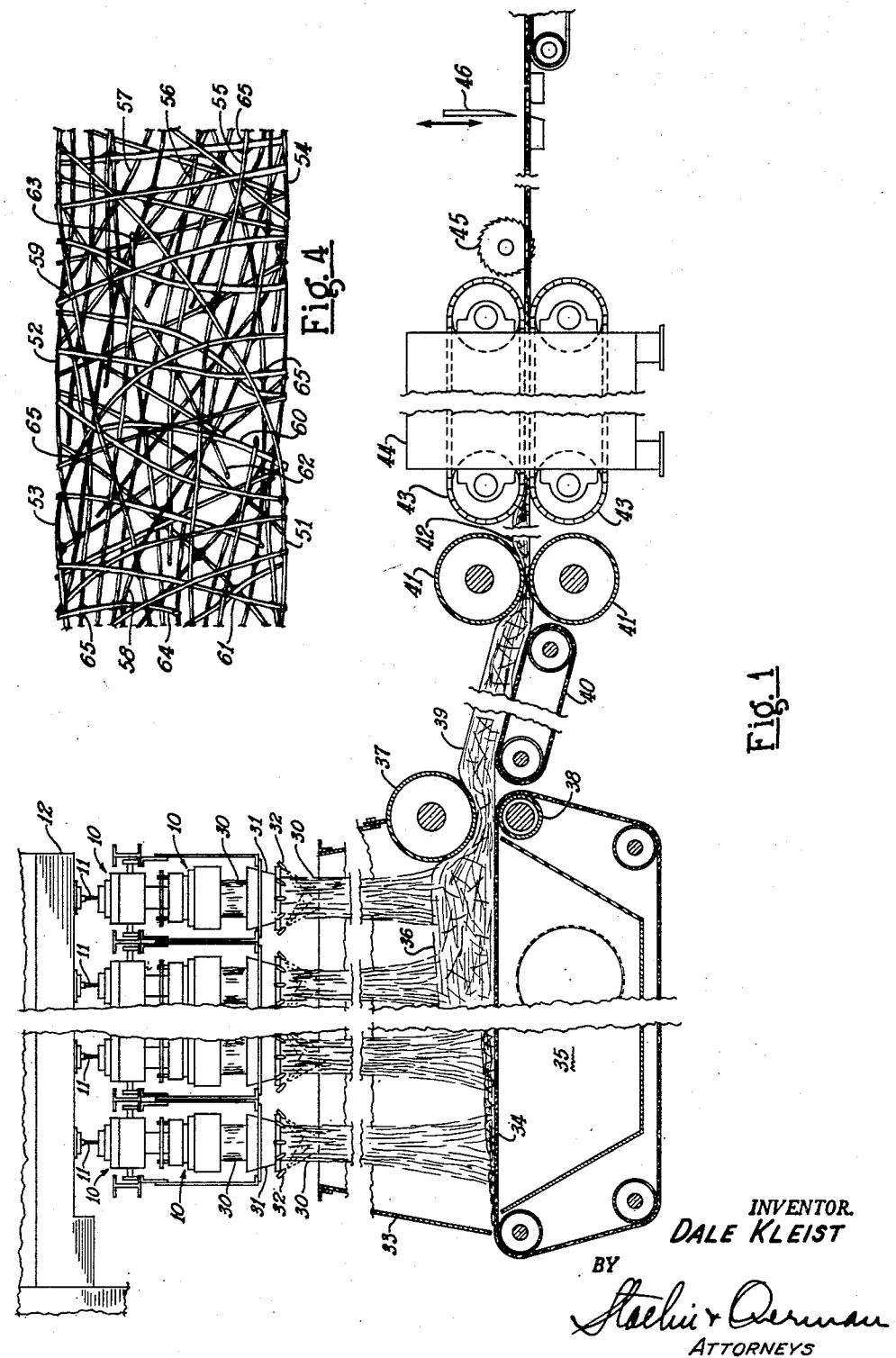
INVENTOR.
DALE KLEIST
BY
*Staehli & Overman*
ATTORNEYS

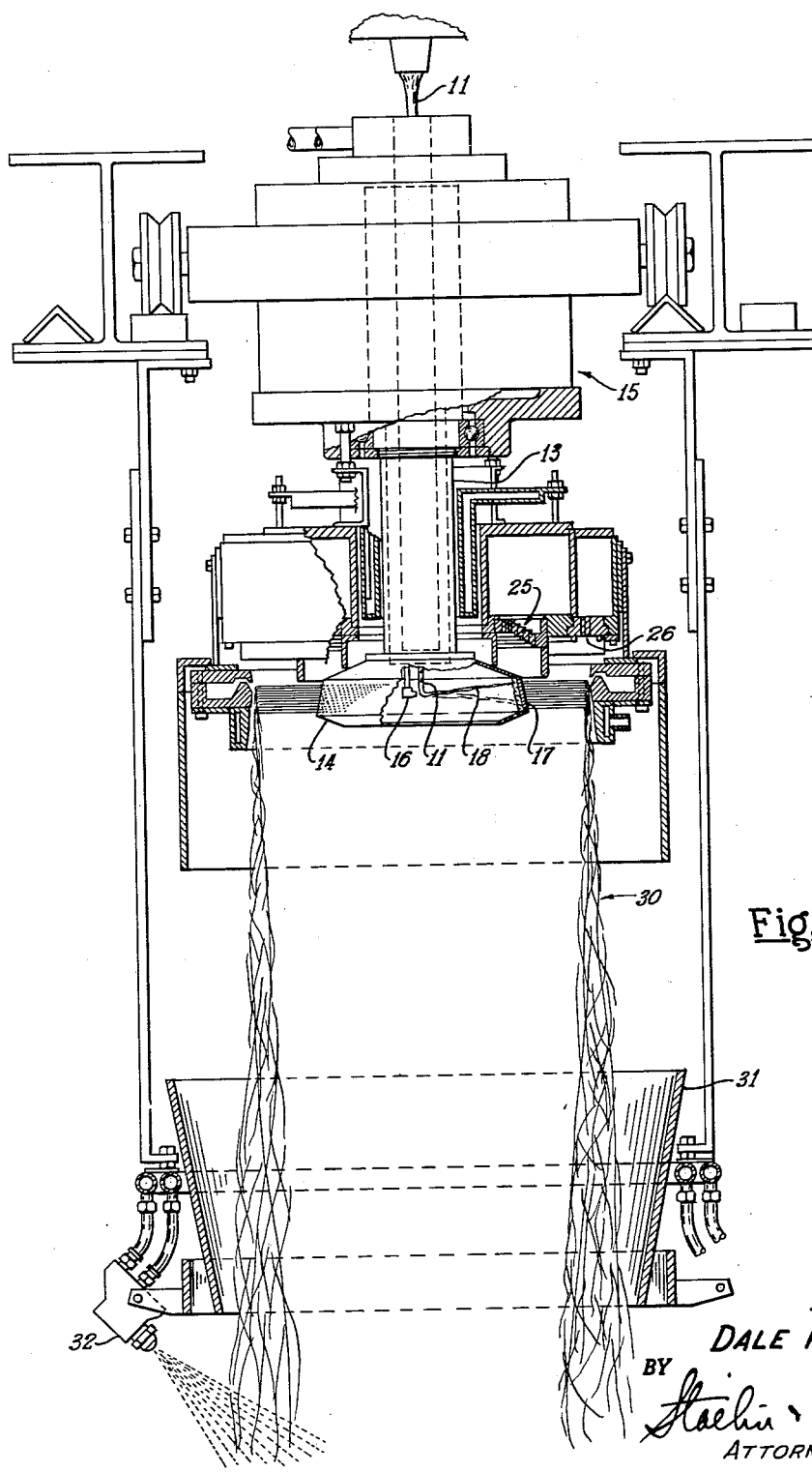

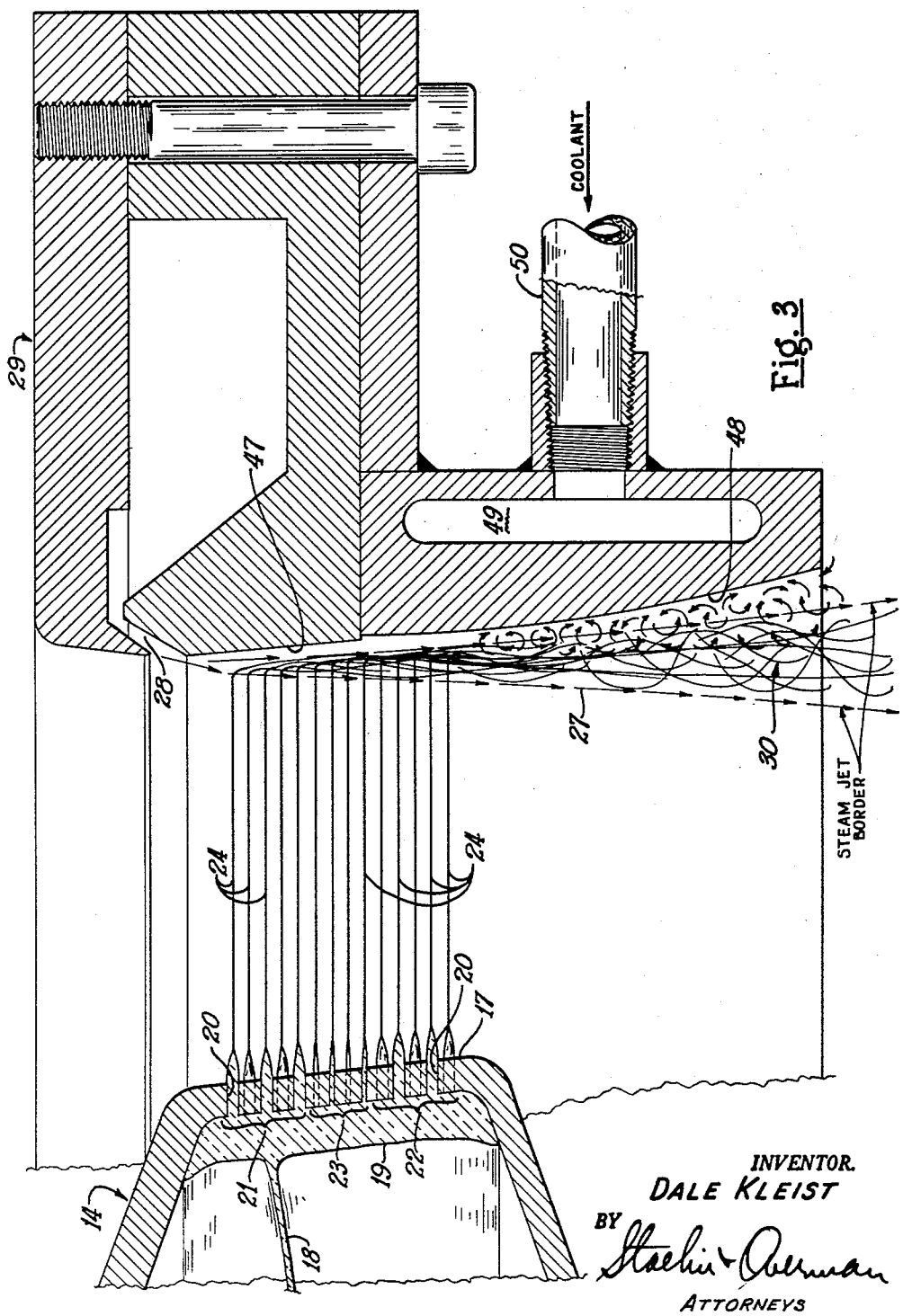

United States Patent Office 3,152,200
Patented Oct. 6, 1964

3,152,200
METHOD AND APPARATUS FOR FORMING
A HIGH DENSITY FIBROUS MASS
Dale Kleist, St. Louisville, Ohio, assignor to Owens-Corning Fiberglas Corporation, a corporation of Delaware
Filed Dec. 5, 1960, Ser. No. 73,880
8 Claims. (Cl. 264—115)

This invention relates to a method and an apparatus for forming a high density fibrous mass and particularly for forming a high density board comprising glass fibers and an adhesive or binder by which the fibers are adhered to each other.

It has been known for many years that by compacting or densifying masses of adhesive or binder coated glass fiber wool and then curing or setting up the binder while the wool is compacted, the fibers of the wool may be bound to each other in the relationship produced by the densification or compaction to form a stiff mass, commonly called a "board," which retains the high thermal insulating property of the looser mass and yet which is structurally stiff enough to be self supporting and/or load bearing in many uses. Previously, boards of this nature have been produced from glass fibers formed by the well-known steam blowing process, the fibers being impregnated with a resin or other binder, collected on a moving web, and then densified to the desired apparent density by being squeezed together for example between parallel conveyor flights spaced from each other a distance equal to the desired finished thickness of the board being produced; the densified or compacted board being suitably treated for example, by heating in a furnace to set up or cure the adhesive. The fibers produced by a steam blowing process vary greatly in their lengths and their diameters, so that one of the characteristics of such a board is the wide spread of both of these physical dimensions of the fibers included in the finished board. This is desirable in a board of this type because the longer fibers lie generally parallel to the main surfaces of the board and hold the board together, while the shorter fibers are randomly disposed, many of them extending generally perpendicularly to the main surfaces of the board and functioning as columns to give the board high resistance to compression. The interstices between the fibers, of course, are not filled with the adhesive or binder and thus the board has high thermal insulating qualities.

Recently rotary centrifuging processes for the formation of glass fibers and glass fiber "wool," have been developed wherein a stream of molten glass is fed to the interior of a rotary element which has a plurality of stream forming orifices in its peripheral surface and the glass is projected through these orifices outwardly into an attenuating blast of gas of high kinetic energy which attenuates the streams of glass into long fine fibers. A rotary process of this type has the very great advantage over the steam blowing process of permitting a considerable increase in the through-put for any given input of energy and heat and produces fibers of less widely varying diameter and greater length than a steam process. From the standpoint of a high density insulating board, however, rotary fibers are insufficiently variable in diameter and almost all are long. This results in almost all of the fibers lying generally parallel to the major faces of the densified board which has a considerably lower resistance to compression than boards produced from steam blown fibers.

It is therefore the principal object of this invention to provide both a method and an apparatus including the concept of initial formation of the fibers by centrifuging and both including steps or means whereby the fibers so produced are given a wider variation in their diameters and in their lengths, and whereby a considerable number of short, stiff fibers become oriented perpendicularly to the larger parallel faces of the densified board.

In achieving the object of the instant invention, it has been discovered that glass fibers produced by a centrifuging process and attenuating blast may be stirred up while in transit from the fiber forming apparatus to a collecting conveyor by the proper utilization of ambient air flow controlled so as to produce violent eddy currents of air by reason of controlling the inflow of air required to satisfy the eductor effect of the fiber attenuating blast, and, it is believed, thereby interrupting the attenuation of some of the fibers so that they are attenuated to a lesser degree than those whose attenuation is uninterrupted and also breaking some of the attenuated fibers into shorter length.

It has also been discovered that when a low density, fluffy blanket or mass of fibers so produced is repeatedly compressed and allowed to expand between compressions, because of the resiliency of the fibers, the stiff fibers in the mass are fractured into shorter lengths and are randomly oriented with a considerable number extending generally perpendicularly to the face of the mass and generally parallel to the direction of the application of compressive forces. After such repeated compression and intermediate expansion, the mass is compressed to the final desired apparent density and the adhesive set up to retain them in that form.

Other and more specific objects and advantages of a method and an apparatus embodying the invention will be better understood by reference to the specification which follows and to the drawings, in which:

FIG. 1 is a fragmentary view, in side elevation, and somewhat diagrammatic in nature, of a production line operation according to the method of the invention and embodying the invention, as set up for the continuous production of a high density glass fiber insulating board, for example, having a nominal density of 9 pounds per cubic foot and capable of standing a compressive force of 20 pounds per square inch at 20% deformation;

FIG. 2 is a fragmentary, enlarged view, partly in elevation and partly in section, of a fiber forming apparatus embodying the invention and operated according to the invention;

FIG. 3 is a greatly enlarged, fragmentary vertical, sectional view illustrating how the inflow of ambient atmosphere is controlled to provide eddy currents of air in order to break up the fibers being produced, and FIG. 4 is a fragmentary, diagrammatical, vertical sectional view through a piece of high density glass fiber board produced according to the invention.

A commercial installation for the production of high density glass fiber boards comprises a number of individual, fibers-forming apparatuses 10 of which two are shown in full and two fragmentarily in FIG. 1. Each of the apparatuses 10 produces a large quantity of fine glass fibers ranging in diameter from about .00001 inch to about .00050 or .00080 inch or higher. These fibers are formed by each of the apparatuses 10 from a stream of molten glass 11 flowed into the respective apparatus 10 from a forehearth 12 or similar source of molten glass.

Referring now to FIG. 2, the stream 11 flows downwardly through a hollow rotary quill 13 into the hollow interior of a fiber-forming centrifuge generally indicated at 14 which is mounted on the lower end of the quill 13 and the quill 13 is rotated at high speed by a motor enclosed within a motor housing generally indicated at 15. Interiorly of the centrifuge 14 there is located a glass distributor, for example, an air jet distributor 16, which diverts the glass stream 11 and distributes it radially outwardly against the interior surface of a peripheral wall 17 of the centrifuge 14. The glass stream 11 is distributed as a distribution stream 18 (FIG. 3) in order to create and maintain an annular body 19 of molten glass on the interior of the peripheral wall 17 of the centrifuge 14. The peripheral wall 17 of the centrifuge 14 has a very large number of orifices 20 formed thereon. The orifices 20 may be drilled or otherwise formed in a plurality of circular rows, of which fourteen are shown in FIG. 3. The orifices 20 may all be of the same diameter but, preferably, some of them are of different diameters as shown in FIG. 3. For example, the uppermost five rows of orifices 20 (indicated by the bracket 21) and the lowermost five rows thereof (indicated by the bracket 22) are shown as being larger than the four central rows (indicated by the bracket 23). While the difference in the diameters of the orifices 20 in the row 23 compared to the rows 21 and 22 are exaggerated in FIG. 3, a difference of .008 inch (i.e., some orifices .031 inch and some .039 inch in diameter) produces a considerable difference in the diameters of streams 24 (usually called "primary fibers," even though still fluid) which are thrown outwardly from the centrifuge 14 as it rotates. If orifices 20 all of the same diameter are used the spread of fiber diameters will be less than when orifices 20 of different diameters are used.

The degree of attenuation of the finer or coarser streams 24 as they fly away from the centrifuge 14 is controlled in a large measure by heat applied to the outer wall of the centrifuge 14 and the area immediately surrounding the peripheral wall 17, from a primary heater generally indicated at 25. If desired, a secondary burner 26 may also be employed for increasing the degree of control of the temperature of the environs surrounding the centrifuge 14.

Centrifugal force projects the material in the streams 24 outwardly from the centrifuge 14 and into an attenuating blast generally indicated at 27, which is directed downwardly from an annular orifice 28 of a blast source, for example, a steam blower 29. Upon entry into the blast 27, the streams 24 are turned downwardly and greatly attenuated by the kinetic energy supplied to the streams 24 by the blast 27, forming the fibers into a downwardly moving horizontal veil, generally indicated by the reference 30.

The veil 30 moves downwardly under the impetus of the diminishing force of the blast 27 through a guide ring 31 which mounts a plurality of binder guns 32 for spraying binder or adhesive onto the fibers in the veil 30. The veil 30 continues to move downwardly into the upper, open end of a hood 33 and the fibers are accumulated on a horizontal conveyor 34 which moves across the bottom of the hood 33 and over a vacuum chamber 35. As the conveyor 34 moves across the hood 33, the fibers accumulate thereon as a continuous mass or blanket 36 gradually increasing in thickness toward the exit side of the hood 33.

The blanket 36 of fibers then is led out of the hood 33 between a large diameter compression roller 37 and the conveyor 34 which is supported at this point by a support roller 38. The roller 37 is spaced above the conveyor 34 a distance which is only a small fraction, say a third or a fourth, of the thickness of the mass of fibers 36, inwardly of the roller 37. Upon departure from between the rollers 37 and 38 the resiliency of fibers in the blanket 36 causes it to expand, as indicated by the reference number 39, to a thickness which is less than the original thickness within the hood 33, but substantially greater than the thickness between the rollers 37 and 38. The blanket 36 is then carried by a subsidiary conveyor 40 to the bite between a pair of compression rollers 41 where once again it is compressed to a small fraction of its previous thickness. As the blanket 36 emerges from between the compression rollers 41, at the position indicated by the reference number 42, it again expands, but, again, to a thickness less than its previous thickness. The fiber blanket 36 is then led between a pair of opposed conveyors 43 between which the blanket 36 is finally compressed to its desired thickness and by which the blanket 36 is led through a furnace 44. In its passage through the furnace 44, the binder or adhesive in the blanket 36 is set up to retain the fibers in their densified relationship so that when the blanket 36 leaves the furnace 44 it is in the form of a cured, densified fibrous glass mass which may be cut longitudinally, for example, by saws 45, and crosswise, for example, by a cutting knife 46, to form stiff, dense boards.

The object of the invention is achieved by a combination of manipulative steps or of elements embodied in the invention. Referring now to FIG. 3, it will be observed that the steam blower 29 has its downwardly directed orifice 28 near its upper edge and that below the orifice 28 the blower 29 has an outwardly inclined wall 47 and, continuing downwardly, an outwardly flared annular skirt 48. The skirt 48 has an inner chamber 49 connected to a coolant pipe 50 for the delivering of a liquid coolant to the skirt 48 in order to maintain its surface at a temperature much lower than would otherwise prevail in the heated environment surrounding the centrifuge 14.

The contour of the skirt 48 is critical to the invention. The blast 27, for example, of steam under pressure or similar gas, expands as it moves away from the orifice through which it is emitted at a rate determined by the relative pressures in the system. In FIG. 3, two broken borderlines (indicated by the legend "Steam Jet Border") have been drawn to indicate the widening border between ambient atmosphere and the jet itself. The jet expands transversely to the direction of its movement as well as parallelly thereto. The increase in horizontal dimension of the moving portion of the jet is herein referred to as the "expansion of the jet" and by the words "rate of expansion" is meant the change in horizontal dimension (crudely indicated by the broken lines with arrowheads) relative to the downward flow of the jet 27. This explanation is made in order to serve as a contrast for the configuration of the inner surface of the skirt 48.

As can be seen in FIG. 3, the curve of the skirt 48 expands, i.e., flares outwardly, at a rate faster than the "rate of expansion" jet 27, so that there exists a downwardly widening space between the outer margin of the jet 27 and the skirt 48. Because the skirt 48 expands or flares outwardly more rapidly than the blast 27, a low pressure area exists between their two borders so that air rushes inwardly from beneath the margin of the skirt 48 to satisfy the low pressure area creating therein a high turbulence and many rotary or eddy currents, which are indicated in FIG. 6 by short, curved arrows. This area of high turbulence at and in the margin of the jet 27 acts upon the fibers being conveyed by the jet and, it is believed, interrupts the attenuation of some of the fibers, disturbs the flow of others, fractures at least some of the longer fibers into shorter lengths so that the variation in both the diameters and lengths of the resulting fibers, is increased and fewer long fibers are produced.

When orifices 20 of different diameters are employed, as in the embodiment illustrated in FIG. 3, the streams 24 projected from those orifices by substantially constant centrifugal force are of different diameters. Therefore, when the blast 27 of constant force, is applied to the primary streams 24 of different diameters, fibers attenuated therefrom by the blast 27 are of initially different lengths and diameters; this action also contributing to the increased variation in fiber diameter and length in the final product.

As a result of the manipulations performed by the eddy currents on the fibers attenuated from the streams 24, as explained above, and upon the blanket of fibers 36 as earlier explained, the stiff, dense board produced according to the invention comprises fibers of various physical characteristics which are generally illustrated in FIG. 4. It will be appreciated that this figure is only illustrative of the type and arrangements of fibers, and is not an accurate depiction. For example, in a board fabricated according to the invention, parts of the surface of the board will be defined by long relatively thin fibers such as the fibers 51, 52, 53 and 54. Other similar long fibers such as the fibers 55, 56, 57 and 58 will extend longitudinally through the mass of the board, at least generally in the directions of the major surfaces of the board rather than primarily perpendicular thereto. Other fibers, some of greater diameter and thus stiffer, for examples, the fibers 59, 60 and 61, extend through the board in directions generally normal to the major surfaces of the board. Some fibers may be broken within the board, for example, broken fibers 62 and 63, while others are broken at the surface of the board, for example, fibers 59, 60 and 61, or shorter vertical fibers such as the fiber 64. Substantially all of the fibers, regardless of diameter or length, are bonded to other fibers by some fillets of binder or adhesive such as those indicated by the reference number 65, so that the board is retained in its densified condition after the binder or adhesive is set up in the furnace 44.

I claim:

1. A method for forming a high density fibrous glass mass including fibers having widely varying lengths and diameters, said method comprising centrifuging primary streams of molten glass outwardly into an annular, downwardly moving, expanding blast of gases, entraining the streams in and attenuating the streams by the gases of the blast, creating turbulence adjacent and in the outer margin of the blast for fracturing and interrupting the attenuation of some of the fibers being attenuated by the blast, applying a settable adhesive to the fibers, collecting the fibers in the form of a loose, low-density blanket, subjecting the blanket to a series of compressions with intermediate releases of pressure and resulting expansion of the blanket for fracturing fibers and orienting shorter fibers generally normal and longer fibers generally parallel to the major faces of the blanket and finally compressing the blanket to the desired apparent density and setting up the adhesive while retaining the blanket at such desired apparent density.

2. A method for forming a high density fibrous glass mass including fibers having widely varying lengths and diameters, said method comprising centrifuging primary streams of molten glass outwardly into an annular, downwardly moving, expanding blast of gases, entraining the streams in and attenuating the streams by the gases of the blast, creating a low pressure zone adjacent the outer margin of the blast, feeding ambient air into such low pressure zone for creating turbulence adjacent and in the outer margin of the blast for fracturing and interrupting the attenuation of some of the fibers being attenuated by the blast, applying a settable adhesive to the fibers, collecting the fibers in the form of a loose, low-density blanket, subjecting the blanket to a series of compressions with intermediate releases of pressure and resulting expansion of the blanket for fracturing larger fibers and orienting some shorter fibers generally normal and longer fibers generally parallel to the major faces of the blanket and finally compressing the blanket to the desired apparent density and setting up the adhesive while retaining the blanket at such desired apparent density.

3. A method for forming a high density fibrous glass mass including fibers having widely varying lengths and diameters, said method comprising centrifuging primary streams of molten glass outwardly into an annular, downwardly moving, expanding blast of gases, entraining the streams in and attenuating the streams by the gases of the blast, creating a low pressure zone adjacent the outer margin of the blast, feeding ambient air into such low pressure zone for creating turbulence adjacent and in the outer margin of the blast for fracturing and interrupting the attenuation of some of the fibers being attenuated by the blast, applying a settable adhesive to the fibers, collecting the fibers in the form of a loose low-density blanket, subjecting the blanket to a series of progressively greater compressions with intermediate releases of pressure and resulting expansion of the blanket for fracturing larger fibers and orienting shorter fibers generally normal and longer fibers generally parallel to the major faces of the blanket and finally compressing the blanket to the desired apparent density and setting up the adhesive while retaining the blanket at such desired apparent density.

4. A method for forming a high density fibrous glass mass including fibers having widely varying lengths and diameters, said method comprising centrifuging primary streams of molten glass of different diameters outwardly into an annular, downwardly moving, expanding blast of gases, entraining the streams in and attenuating the streams by the gases of the blast, creating a low pressure zone adjacent the outer margin of the blast, feeding ambient air into such low pressure zone for creating turbulence adjacent and in the outer margin of the blast for interrupting the attenuation of some of the fibers being attenuated by the blast, applying a settable adhesive to the fibers, collecting the fibers in the form of a loose low-density blanket, subjecting the blanket to a series of compressions with intermediate releases of pressure and resulting expansion of the blanket for fracturing larger fibers and orienting some of the shorter fibers generally normal, and the longer fibers generally parallel to the major faces of the blanket and finally compressing the blanket to the desired apparent density and setting up the adhesive while retaining the blanket at such desired apparent density.

5. A method according to claim 4 in which the low pressure zone is created by establishing an annular barrier around the outer margin of that portion of the downward path of the blast wherein the fibers are being attenuated by the blast, the barrier being spaced a progressively greater distance from such margin downwardly along such margin and terminating at a level such that ambient air flows inwardly around the bottom of the barrier and into the zone and the margin of the blast.

6. Apparatus for forming a high density fibrous glass mass including fibers having widely varying lengths and diameters, said apparatus comprising a centrifuge for projecting primary streams of molten glass outwardly therefrom, means for directing an annular, downwardly moving, expanding blast of gases coaxially with and spaced from said centrifuge, said blast having sufficient kinetic energy for entraining the streams and attenuating the streams by the gases of the blast, means for creating turbulence adjacent and in the outer margin of the blast for fracturing and interrupting the attenuation of some of the fibers being attenuated by the blast, means for applying a settable adhesive to the fibers, a conveyor for collecting the fibers in the form of a loose low-density blanket, a plurality of spaced compression mechanisms for subjecting the blanket to a series of compressions with intermediate releases of pressure and resulting expansion of the blanket therebetween for fracturing larger fibers and orienting some of the shorter fibers generally normal and the longer fibers generally parallel to the major faces of the blanket, means for compressing the blanket to the desired apparent density and a furnace with means for feeding said blanket therethrough for setting up the adhesive while retaining the blanket at such desired apparent density.

7. Apparatus according to claim 6 in which the means for creating turbulence adjacent and in the outer margin of the blast comprises an annular downwardly and outwardly flaring skirt positioned beneath the blast creating means and circumscribing the blast created thereby, the rate of outward flaring of said skirt being in excess of the horizontal expansion of the blast whereby a downwardly widening zone of low pressure borders the outer margin of the blast.

8. Apparatus for forming a high density fibrous glass mass including fibers having widely varying lengths and diameters, said apparatus comprising a centrifuge for projecting primary streams of molten glass outwardly therefrom, means for directing an annular, downwardly moving, expanding blast of gases coaxially with and spaced from said centrifuge, said blast having sufficient kinetic energy for entraining the streams and attenuating the streams by the gases of the blast, means for creating a low pressure zone adjacent the outer margin of the blast whereby ambient air flows into such low pressure zone for creating turbulence adjacent and in the outer margin of the blast for fracturing and interrupting the attenuation of some of the fibers being attenuated by the blast, means for applying a settable adhesive to the fibers, a conveyor for collecting the fibers in the form of a loose low-density blanket, a plurality of spaced compression mechanisms for subjecting the blanket to a series of compressions with intermediate releases of pressure and resulting expansion of the blanket therebetween for fracturing larger fibers and randomly orienting shorter fibers with some extending generally normal and the longer fibers extending generally parallel to the major faces of the blanket, means for compressing the blanket to the desired apparent density and a furnace with means for feeding said blanket therethrough for setting up the adhesive while retaining the blanket at such desired apparent density.

References Cited in the file of this patent

UNITED STATES PATENTS

| | | |
|---|---|---|
| 2,600,843 | Bush | June 17, 1952 |
| 2,897,874 | Stalego et al. | Aug. 4, 1959 |
| 2,931,422 | Long | Apr. 5, 1960 |